(12) United States Patent
Yamaji et al.

(10) Patent No.: US 10,267,575 B2
(45) Date of Patent: Apr. 23, 2019

(54) HEADER OF HEAT EXCHANGER AND HEAT EXCHANGER PROVIDED WITH THE SAME

(71) Applicant: NORITZ CORPORATION, Hyogo (JP)

(72) Inventors: Hiroki Yamaji, Kobe (JP); Yuta Tsuji, Kobe (JP)

(73) Assignee: NORITZ CORPORATION, Hyogo (JP)

( * ) Notice: Subject to any disclaimer, the term of this patent is extended or adjusted under 35 U.S.C. 154(b) by 279 days.

(21) Appl. No.: 14/844,902

(22) Filed: Sep. 3, 2015

(65) Prior Publication Data

US 2016/0091263 A1 Mar. 31, 2016

(30) Foreign Application Priority Data

Sep. 26, 2014 (JP) .................. 2014-196585

(51) Int. Cl.
| | | |
|---|---|---|
| *F28F 9/02* | (2006.01) | |
| *F28D 7/02* | (2006.01) | |
| *F28D 7/06* | (2006.01) | |
| *F24H 1/41* | (2006.01) | |
| *F24H 1/43* | (2006.01) | |

(Continued)

(52) U.S. Cl.
CPC .................. *F28F 9/02* (2013.01); *F24H 1/41* (2013.01); *F24H 1/43* (2013.01); *F28D 7/024* (2013.01); *F28D 7/087* (2013.01); *F28D 21/0007* (2013.01); *F28F 9/001* (2013.01); *F28F 9/0224* (2013.01); *F28F 9/0248* (2013.01); *F28F 9/18* (2013.01); *F24H 8/00* (2013.01); *F28F 2225/08* (2013.01); *Y02B 30/102* (2013.01)

(58) Field of Classification Search
CPC . F28D 7/02; F28D 7/024; F28D 7/026; F28D 7/01615; F28D 7/087; F28D 21/0007; F28F 9/0219; F28F 9/0224; F28F 9/0231; F28F 9/0246; F28F 2265/14; F28F 2265/26; F28F 2225/08; F28F 9/0226
USPC ......................................... 165/158, 163, 173
See application file for complete search history.

(56) References Cited

U.S. PATENT DOCUMENTS 1,739,018 A * 12/1929 Shipley ..................... F28F 9/00
                                                                   165/158
6,082,439 A * 7/2000 Kato ..................... F28F 9/0226
                                                                   165/173

(Continued)

FOREIGN PATENT DOCUMENTS

JP             2014-070844 A     4/2014

*Primary Examiner* — Jason N Thompson
(74) *Attorney, Agent, or Firm* — Studebaker & Brackett PC

(57) ABSTRACT

A header of a heat exchanger including a first wall connected with a plurality of heat transfer tubes of the heat exchanger, a second wall facing the first wall with an interval therebetween, and a circumferential wall connecting outer circumferential edges of the first and the second walls in such a manner that an area between the first and the second walls constitutes a chamber for inflow of fluid, the chamber communicating with each of the heat transfer tube. At least one of the first and the second walls is configured to curve in such a manner that a central area of the wall is positioned close to an inside of the chamber than an outer circumferential area of the wall. The thickness of the header is reduced and enough strength of the header is obtained, thereby preferably enduring repeating water hammer.

10 Claims, 10 Drawing Sheets

(51) Int. Cl.
  *F28F 9/00*   (2006.01)
  *F28F 9/18*   (2006.01)
  *F28D 7/08*   (2006.01)
  *F28D 21/00*  (2006.01)
  *F24H 8/00*   (2006.01)

(56) References Cited

U.S. PATENT DOCUMENTS

| | | | | |
|---|---|---|---|---|
| 6,269,870 | B1* | 8/2001 | Banzhaf | F01N 3/0205 |
| | | | | 165/158 |
| 6,540,016 | B1* | 4/2003 | Baldantoni | F28F 9/02 |
| | | | | 165/173 |
| 2002/0162651 | A1* | 11/2002 | Nakagome | F28F 9/0229 |
| | | | | 165/158 |
| 2003/0010479 | A1* | 1/2003 | Hayashi | F01N 5/02 |
| | | | | 165/157 |
| 2005/0098307 | A1* | 5/2005 | Goto | F28D 7/1615 |
| | | | | 165/146 |
| 2007/0012425 | A1* | 1/2007 | Sugito | F28D 1/05366 |
| | | | | 165/81 |
| 2010/0146953 | A1* | 6/2010 | Bhatti | F01N 5/02 |
| | | | | 60/320 |
| 2011/0240277 | A1* | 10/2011 | Westergard | B21D 26/033 |
| | | | | 165/173 |
| 2013/0264037 | A1* | 10/2013 | Otsubo | F28D 7/085 |
| | | | | 165/157 |
| 2014/0090827 | A1 | 4/2014 | Iguchi et al. | |

\* cited by examiner

HEADER OF HEAT EXCHANGER AND HEAT EXCHANGER PROVIDED WITH THE SAME

BACKGROUND OF THE INVENTION

Field of the Invention

The present invention relates to a technology concerning a heat exchanger to be used as a constituting element of a water heater.

Description of the Related Art

One example of the heat exchanger is disclosed in Patent Literature 1.

The disclosed heat exchanger has a plurality of heat transfer tubes and a case housing the heat transfer tubes. A part of a side wall of the case bulges out of the case. An auxiliary member is fitted to the bulging portion to constitute a header for entering water or delivering heated water, the header including a chamber. The heat transfer tubes are welded to a tip end wall of the bulging portion and the insides of the heat transfer tubes are communicated with the chamber.

In such a structure, heated water is able to appropriately flow in or out of the heat transfer tubes using the header. Further, the header is formed utilizing the side wall of the case, thereby reducing the number of members and downsizing the entire apparatus. In addition, the production cost is preferably reduced.

However, there is still a room for improvement in the conventional art as mentioned below.

The header of the heat exchanger is connected with a piping member attached with several kinds of fluid devices such as an electromagnetic on-off valve. There is a fear of water hammer in a route of the piping member. When water hammer occurs, the water pressure in the header remarkably increases. Water hammer may repeatedly occur several times. Therefore, the header is required to be constituted so as to have enough durability against repeating change of the inner pressure. In the header, the tip end wall of the bulging portion and a part of the auxiliary member facing the tip end wall are in the shape of a flat plate and have a large dimension, thereby easily causing flexural deformation at the time of water hammer so that an adequate strength is required. Specifically, when the plurality of heat transfer tubes are welded to the tip end wall of the bulging portion, the tip end wall is distorted due to welding and easily curves opposite to the chamber, to be mentioned later referring to FIG. 5. In such a case, the tip end wall easily deforms due to increase of the inner pressure and there is a disadvantage such that a large stress concentrates on the welded portion of each heat transfer tube. In order to resolve such a problem, the thickness of the header can be increased and the stiffness of the header can be increased. However, when such a solution is simply applied, the production cost and the weight of the apparatus increase.

CITATION LIST

Patent Literature 1: Japanese Unexamined Patent Publication No. 2014-70844

SUMMARY OF THE INVENTION

An object of the present invention is to provide a header of a heat exchanger capable of appropriately inhibiting or preventing the above-mentioned disadvantages and to provide a heat exchanger provided with the header.

The present invention proposes the following technical measures for solving the above-mentioned problems.

A header of a heat exchanger provided in the first aspect of the present invention includes a first wall connected with a plurality of heat transfer tubes of the heat exchanger, a second wall facing the first wall with an interval therebetween, and a circumferential wall connecting outer circumferential edges of the first and the second walls in such a manner that an area between the first and the second walls constitutes a chamber for inflow of fluid, the chamber communicating with each of the heat transfer tubes. At least one of the first and the second walls is configured to curve in such a manner that a central area of the wall is positioned closer to an inside of the chamber than an outer circumferential area of the wall.

Preferably, the first wall and the plurality of heat transfer tubes are connected in such a manner that the plurality of heat transfer tubes are inserted into a plurality of holes provided for the first wall and inserted portions are welded. At least the first wall of the first and the second walls is configured to curve as mentioned above.

Preferably, both of the first and the second walls are configured to curve as mentioned above.

A header of a heat exchanger provided in the second aspect of the present invention includes a first wall connected with a plurality of heat transfer tubes of the heat exchanger, a second wall facing the first wall with an interval therebetween, and a circumferential wall connecting outer circumferential edges of the first and the second walls in such a manner that an area between the first and the second walls constitutes a chamber for inflow of fluid, the chamber communicating with each of the heat transfer tubes. At least one of the first and the second walls is provided with at least one protruding portion partially protruding into an inside or an outside of the chamber.

Preferably, the protruding portion protrudes into the inside of the chamber.

Preferably, the protruding portion is a protruding portion provided between connection portions of the plurality of heat transfer tubes on the first wall.

Preferably, the plurality of heat transfer tubes are connected to the first wall so as to be arranged in a fixed direction, and the protruding portion is a protruding portion provided at a position of the first wall being offset in a direction intersecting the fixed direction relative to the connection portions of the plurality of heat transfer tubes, the protruding portion being configured to be elongated in the fixed direction.

Preferably, the second wall is provided with a joint tube body, the second wall and the circumferential wall are integrally formed, and the outer circumferential edge of the first wall is continuously formed with a cylindrical wall, the cylindrical wall being formed so as to protrude opposite to the second wall from the outer circumferential edge, and the circumferential wall is fitted to the cylindrical wall to be jointed.

A heat exchanger provided in the third aspect of the present invention includes the header provided in the first aspect or the second aspect of the present invention.

Preferably, the heat exchanger includes a case housing the plurality of heat transfer tubes, a bulging portion having a cylindrical wall and a tip end wall, the cylindrical wall being configured to bulge out of a side wall of the case in an outward direction or an inward direction of the case, the tip end wall closing a tip end of the cylindrical wall and being connected with the plurality of heat transfer tubes, and an auxiliary member formed separate from the side wall of the case. The side wall of the case is connected with the auxiliary member in such a manner that the chamber is formed by the bulging portion and the auxiliary member, the tip end wall of the bulging portion constitutes the first wall of the header, and the auxiliary member constitutes the second wall.

Preferably, the cylindrical wall of the bulging portion bulges out of the side wall of the case in an outward direction of the case, the auxiliary member has a hollow main body having an open edge forming an opening corresponding to the bulging portion, and the open edge is fitted onto the bulging portion to be welded.

Preferably, the side wall of the case is constituted with a metal plate, and the bulging portion is integrally formed with the side wall by a press-working, and the cylindrical wall and the tip end wall of the bulging portion are integrally connected.

Preferably, each of the plurality of heat transfer tubes is constituted with a helical tube body or a meandering tube body, the case has a supply port of heating gas and a discharge port of heating gas, and the heating gas flowing in the case from the supply port flows out of the case from the discharge port after working on the tube body.

Other characteristics and advantages of the present invention will be apparent in the following detailed description of the preferred embodiments referring to the attached drawings.

DETAILED DESCRIPTION OF THE PREFERRED EMBODIMENT

Figure 1:
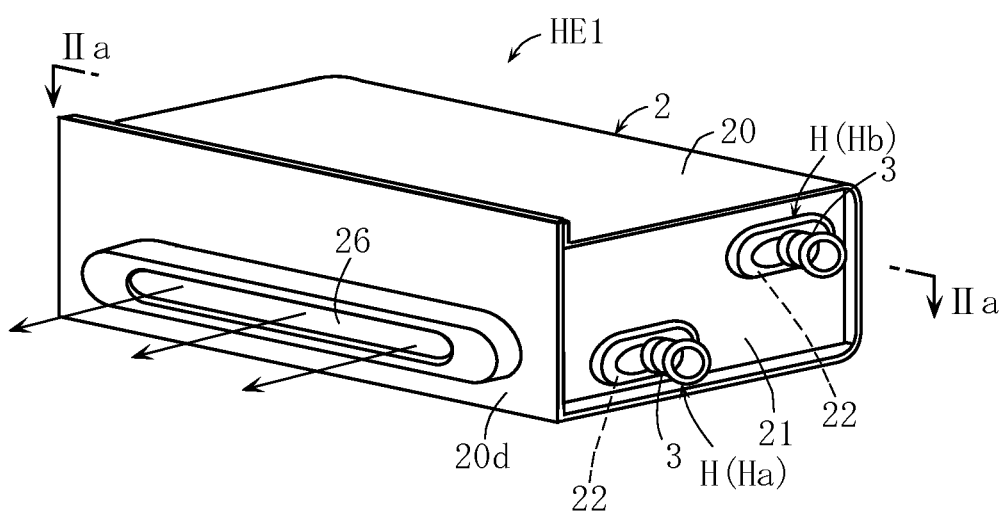
FIG. 1 is an externally perspective view showing one example of a heat exchanger of the present invention.

Preferred embodiments of the present invention are explained below with reference to the accompanying drawings.

In the embodiments to be mentioned below, the elements same as or similar to those in the precedent embodiments are allotted with the same reference numerals and the redundant explanation is omitted.

First Embodiment

Figure 2A:
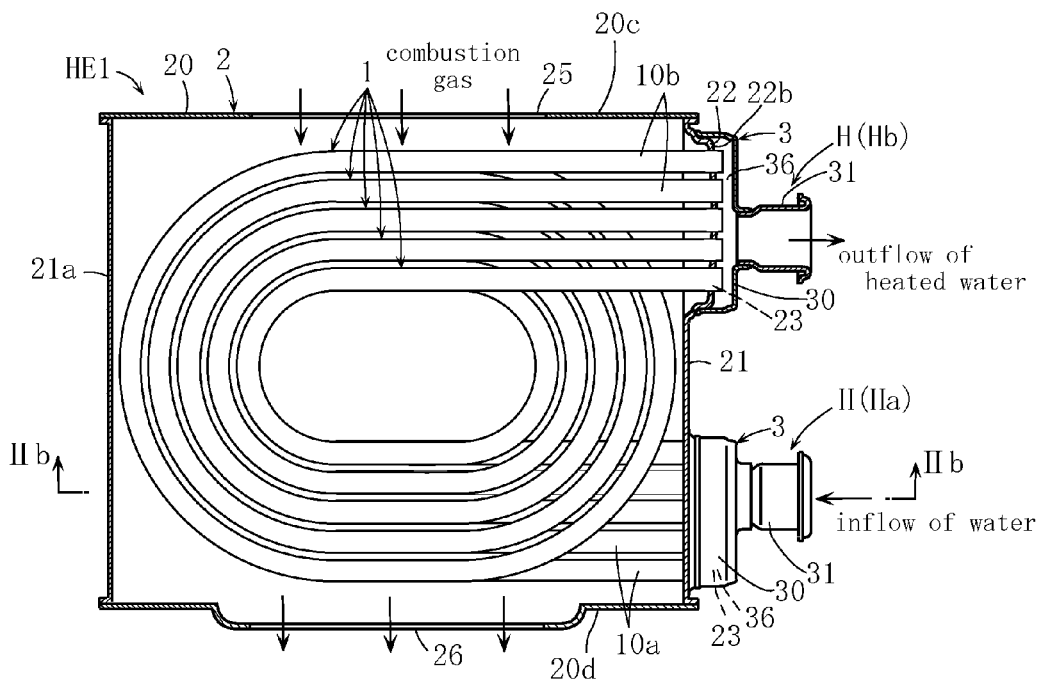
FIG. 2A is a sectional view taken along the line IIa to IIa in FIG. 1
Figure 2B:
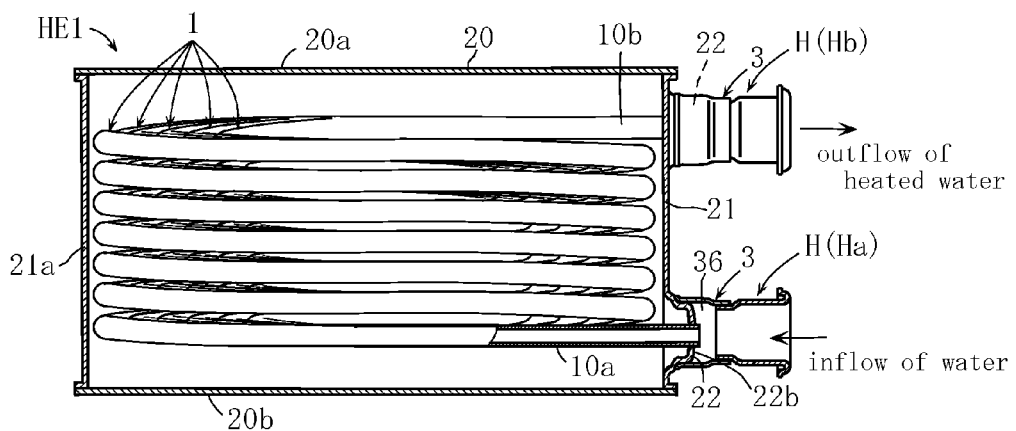
FIG. 2B is a sectional view taken along the line IIb to IIb in FIG. 2A.

A heat exchanger HE1 shown in FIG. 1, FIG. 2A and FIG. 2B is a heat exchanger provided for a water heater to recover latent heat and is used for heating water by recovering heat from combustion gas generated by a burner (not shown in the figure) such as a gas burner. The heat exchanger HE1 has a similar basic structure to the heat exchanger disclosed in Patent Literature 1. Specifically, the heat exchanger HE1 has a case 2, a plurality of heat transfer tubes 1 housed in the case 2, and a pair of headers H (Ha, Hb) connected to lower ends and upper ends of the heat transfer tubes 1 so as to enter water and deliver heated water, respectively.

The plurality of heat transfer tubes 1 are formed with a plurality of helical tube bodies substantially in the form of an ellipse or a rectangle as seen in plan view. The helical tube bodies have different sizes and are arranged to be wound and overlapped in a substantially concentric manner. An upper portion and a lower portion of each of the heat transfer tubes 1 are straight tube bodies 10a, 10b extending almost horizontally.

The case 2, like a cuboid, has a main body 20 constituted with a rectangle-tubular stem body and a pair of side walls 21, 21a closing both openings in a width direction of the main body 20. The main body 20 and the side walls 21, 21a are constituted with metal plates such as a stainless steel. A rear wall 20c of the case 2 has an inlet port 25. Combustion gas entered in the case 2 from the inlet port 25 passes through gaps between the plurality of heat transfer tubes 1 and reaches an outlet port 26 provided for a front wall 20d. In such a procedure, heat is recovered from combustion gas by each of the heat transfer tubes 1 and water in each heat transfer tube 1 is heated.

The side wall 21 of the case 2 is formed with two bulging portions 22. Each bulging portion 22 is formed by a press-working of the side wall 21. As shown in FIG. 3A, FIG. 3B, FIG. 4A and FIG. 4B, each bulging portion 22 has a cylindrical wall 22a bulging out of the case 2 and a tip end wall 22b closing a tip end of the cylindrical wall 22a.

Figure 3A:
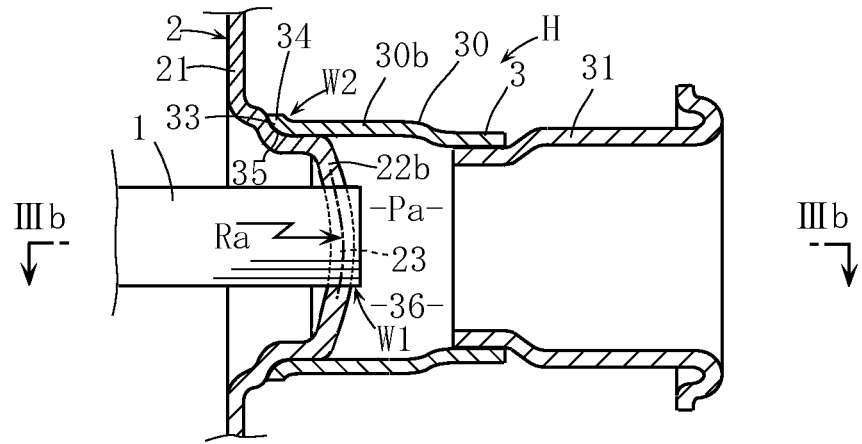
FIG. 3A is an enlarged sectional view of the substantial part of FIG. 2B.
Figure 3B:
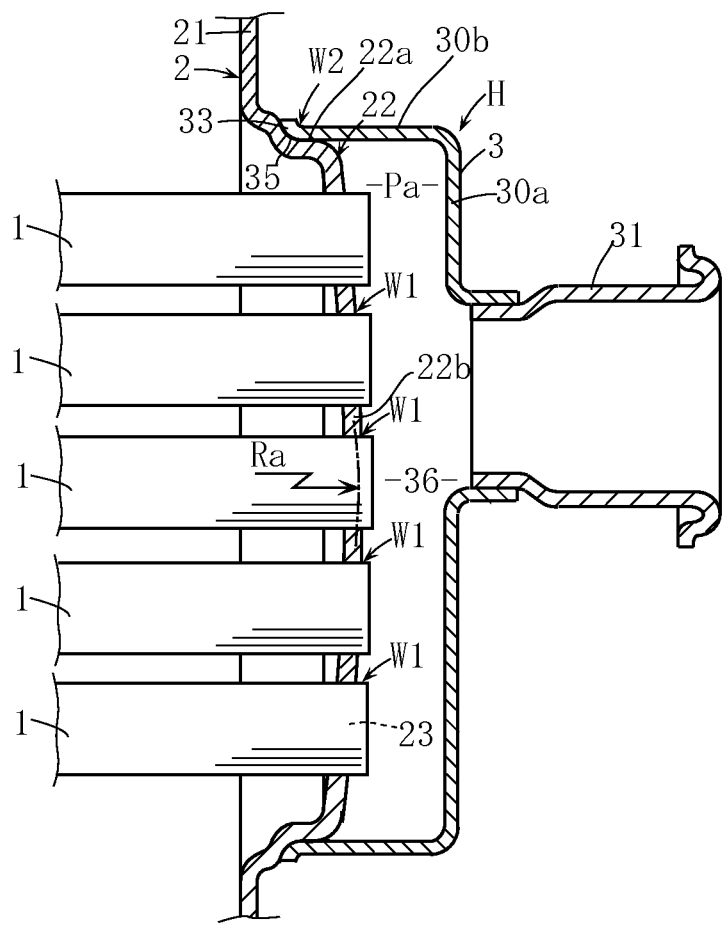
FIG. 3B is a sectional view of the substantial part taken along the line IIIb to IIIb in FIG. 3A.
Figure 4A:
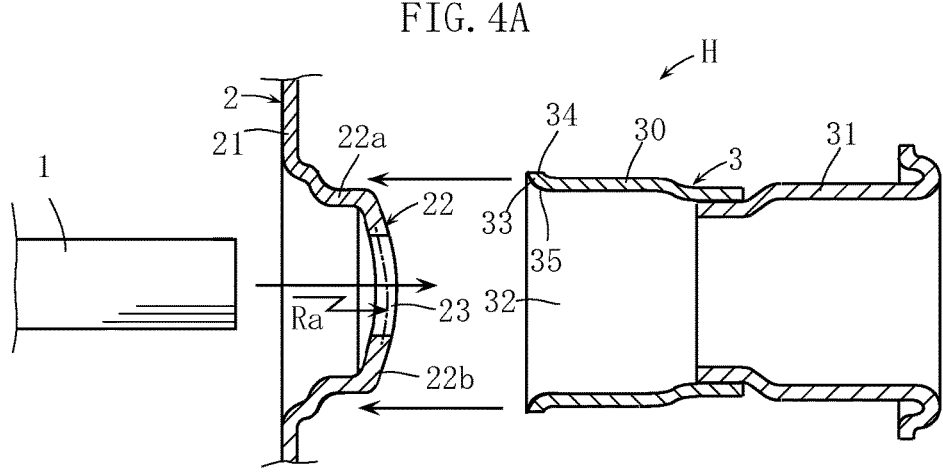
FIG. 4A is an exploded sectional view of FIG. 3A
Figure 4B:
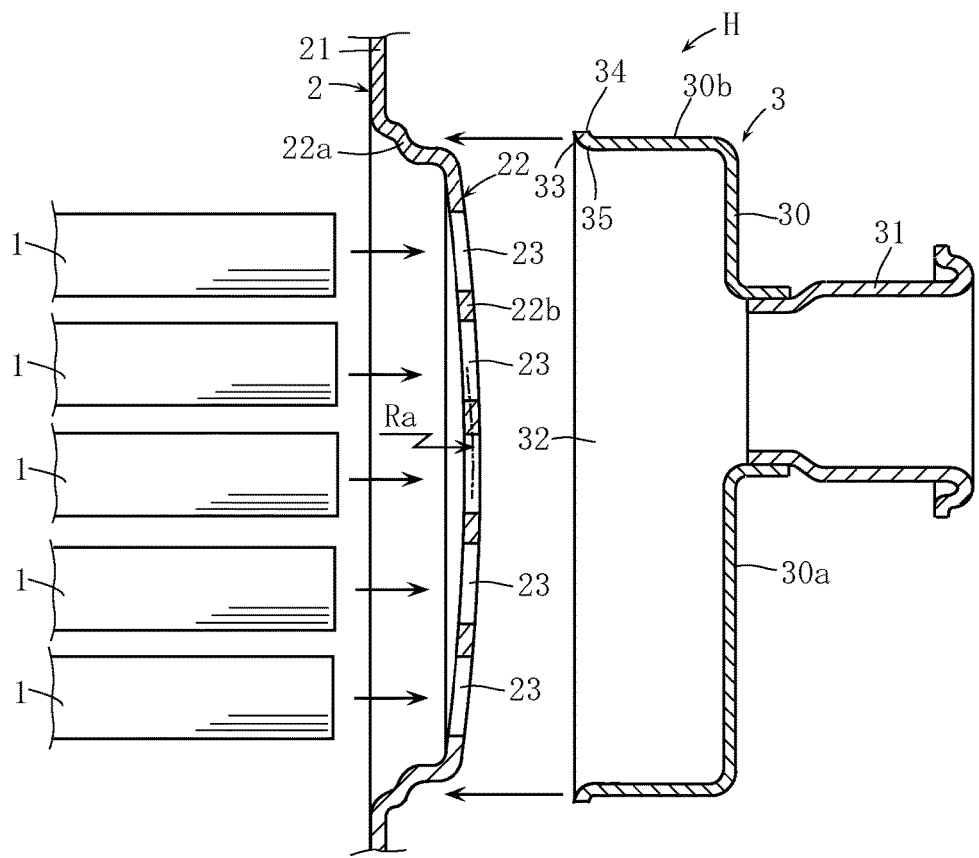
FIG. 4B is an exploded sectional view of FIG. 3B.

The tip end wall 22b corresponds to one example of "the first wall" of the header in the present invention. The tip end wall 22b curves at a suitable curvature radius Ra in such a manner that a central area of the tip end wall 22b is positioned closer to the outside of the case 2 (namely, inside of a chamber 36 to be mentioned later) than the outer circumferential area thereof. The process to curve the tip end wall 22b is able to be done at the same time of a press molding of the bulging portion 22. The plurality of heat transfer tubes 1 are inserted into a plurality of holes 23 provided for the tip end wall 22b and are welded to the tip end wall 22b. (The reference numeral W1 in FIG. 3A and FIG. 3B shows the welded portion.)

The header H is constituted such that an auxiliary member 3 is fitted onto the bulging portion 22 to be welded. The auxiliary member 3 has a hollow main body 30 having on the front face an open edge 33 constituting an opening 32 corresponding to the bulging portion 22. The auxiliary member 3 also has a joint tube body 31 connected to the rear face of the main body 30. The joint tube body 31 is a member to connect with a piping member supplying heated water to the header H or a piping member to discharge heated water from the header H.

The outer circumference of the open edge 33 is integrally formed with a flange 34 shortly protruding outward from the open edge 33. The auxiliary member 3 is fitted onto the bulging portion 22 in such a manner that a curved surface 35 formed on the inner circumference of a tip end of the open edge 33 of the auxiliary member 3 abuts on the outer surface of a base of the cylindrical wall 22a and the abutting portion is welded. (The reference numeral W2 in FIG. 3A and FIG. 3B shows the welded portion.) In such a structure, the area, facing the tip end wall 22b, inside the auxiliary member 3 constitutes a chamber 36 for heated water, the chamber 36 communicating with each heat transfer tube 1. A wall 30a, facing the tip end wall 22b via the chamber 36, of the main body 30 of the auxiliary member 3 corresponds to one example of "the second wall" in the present invention.

However, in the embodiment of the present invention, the wall 30a does not curve toward the inside of the chamber 36. A circumferential wall 30b, surrounding the chamber 36, of the main body 30 of the auxiliary member 3 corresponds to "the circumferential wall" of the header in the present invention.

Operational effects of the above-mentioned heat exchanger HE1 are explained hereinafter.

In FIG. 3A and FIG. 3B, a water pressure Pa in the chamber 36 of the header H acts on each part of the header H, namely the tip end wall 22b of the bulging portion 22 (the first wall of the header), the wall 30a of the auxiliary member 3 (the second wall of the header), and the circumferential wall 30b. The tip end wall 22b of the bulging portion 22 curves so as to protrude toward the inside of the chamber 36, so that the above-mentioned water pressure causes compression stress to the tip end wall 22b. This is the same principle as the case that compression stress is generated at parts of an arch when an arched structure receives load.

Unlike the embodiment of the present invention, when the tip end wall 22b is formed flat or curves toward the outside of the chamber 36, tensile stress is generated at the tip end wall 22b by the water pressure Pa, thereby easily causing bending deformation. However, in the embodiment of the present invention, it is possible to cause compression stress to the tip end wall 22b and to enhance the strength of the tip end wall 22b so as not to easily generate flexural deformation. When water hammer occurs in the piping route connected to the header H, the water pressure Pa rapidly and remarkably increases. In such a phenomenon, it is possible not to cause a large flexural deformation to the tip end wall 22b. Such an advantageous effect prevents a large stress on the welded portion W1 of the tip end wall 22b with the heat transfer tube 1 and prevents the welded portion W1 from being fragile.

Figure 5:
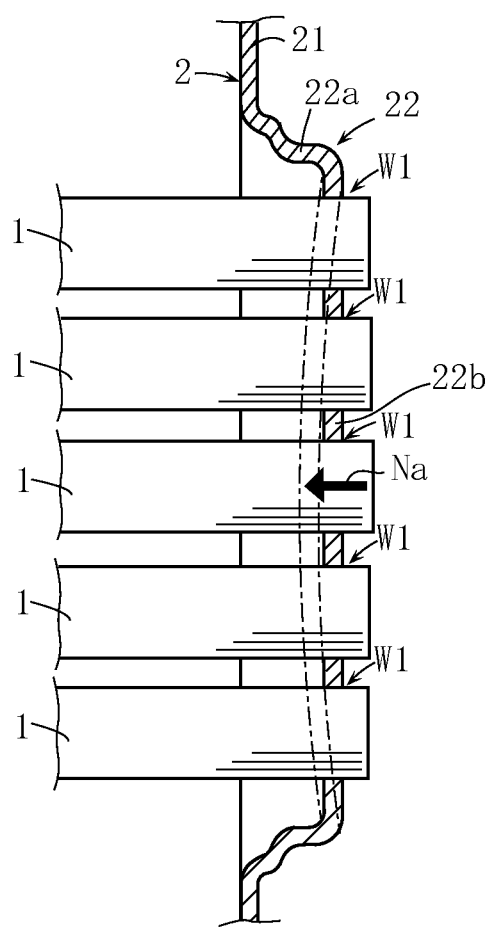
FIG. 5 is an enlarged sectional view showing a comparison example with an embodiment of the present invention.

FIG. 5 is an explanatory view compared with the embodiment of the present invention. In FIG. 5, the tip end wall 22b of the bulging portion 22 is flat. When the plurality of heat transfer tubes 1 and the tip end wall 22b are welded from the outside of the tip end wall 22b in such a structure, the tip end wall 22b is distorted so as to curve toward the inside of the case 3 (toward the outside of the chamber) as shown with the arrow Na. In case of such a distortion of the tip end wall 22b, the tip end wall 22b easily causes a large tensile stress by the pressure in the chamber 36. On the other hand, in the embodiment of the present invention, such a disadvantage is preferably avoided.

The tip end wall 22b of the bulging portion 22 is able to be reinforced by the above-mentioned principle, so that the tip end wall 22b is able to be thin and in addition the side wall 21 of the case 2 is able to be thin, thereby reducing the production cost of the heat exchanger HE1. The water pressure Pa in the chamber 36 acts also on the walls 30a, 30b of the auxiliary member 3; however, the walls 30a, 30b are able to have enough strength by increasing the width of the auxiliary member 3. The production cost does not increase so much when the thickness of the auxiliary member 3 increases. The measure to be mentioned later is employed in order to enhance the strength of the wall 30a.

Second Embodiment

Figure 6:
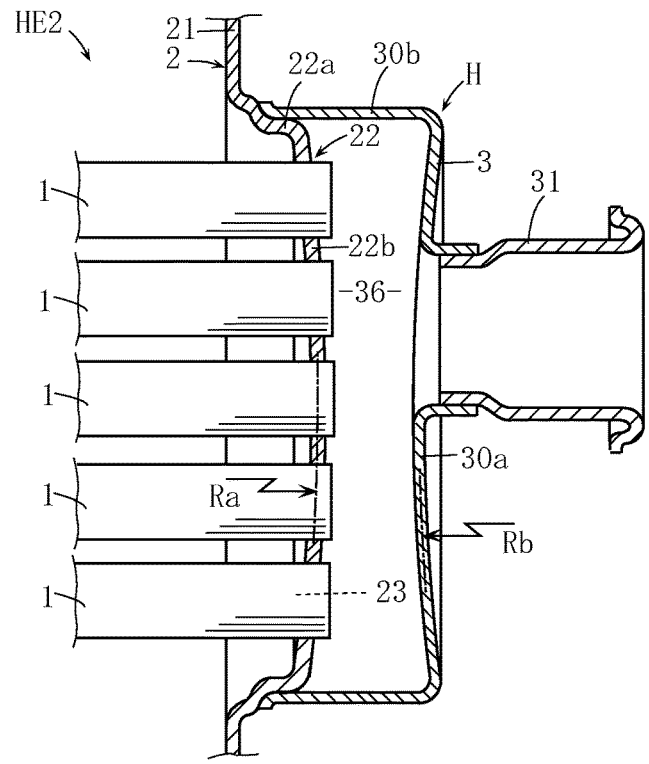
FIG. 6 is a sectional view of the substantial part showing another embodiment of the present invention.

In a heat exchanger HE2 shown in FIG. 6, in addition to the tip end wall 22b of the bulging portion 22 (the first wall of the header), the wall 30a of the auxiliary member 3 (the second wall of the header) curves at a suitable curvature radius Rb toward the inside of the chamber 36.

In such a structure, the strength of the wall 30a is able to be enhanced like the same principle applied to the tip end wall 22b. Accordingly, such a structure is preferable to reduce the thickness of the parts of the header H and to enhance the entire strength.

Third Embodiment

Figure 7:
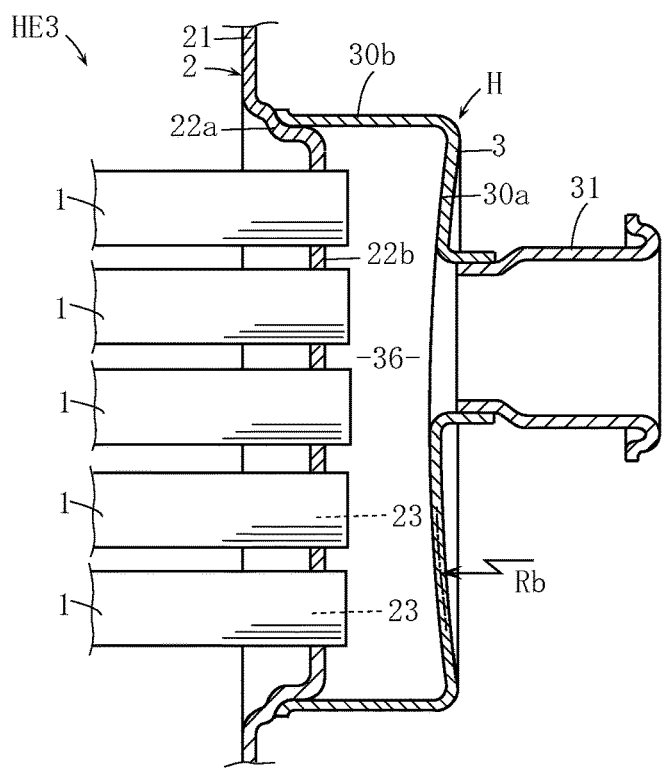
FIG. 7 is a sectional view of the substantial part showing another embodiment of the present invention.

In a heat exchanger HE3 shown in FIG. 7, the tip end wall 22b of the bulging portion 22 (the first wall of the header) is flat. On the other hand, the wall 30a of the auxiliary member 3 (the second wall of the header) curves toward the inside of the chamber 36. In such a structure, although no measure is taken for enhancing the strength of the tip end wall 22b, the strength of the wall 30a is appropriately enhanced. Accordingly, compared with the conventional art, a preferable advantageous effect is obtained.

Fourth Embodiment

Figure 8A:
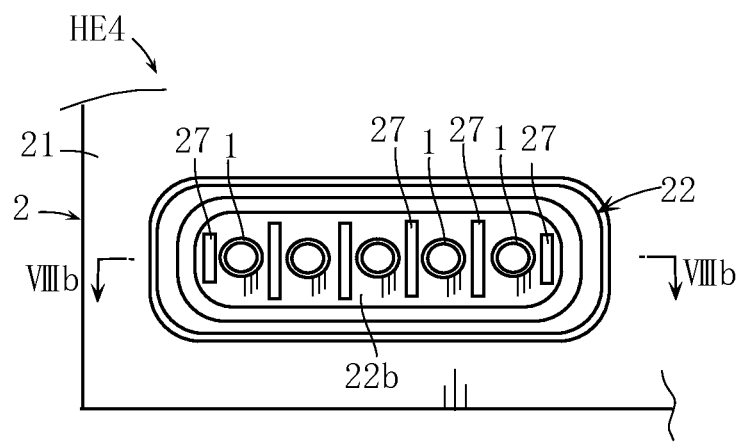
FIG. 8A is a front view of the substantial part showing another embodiment of the present invention.
Figure 8B:
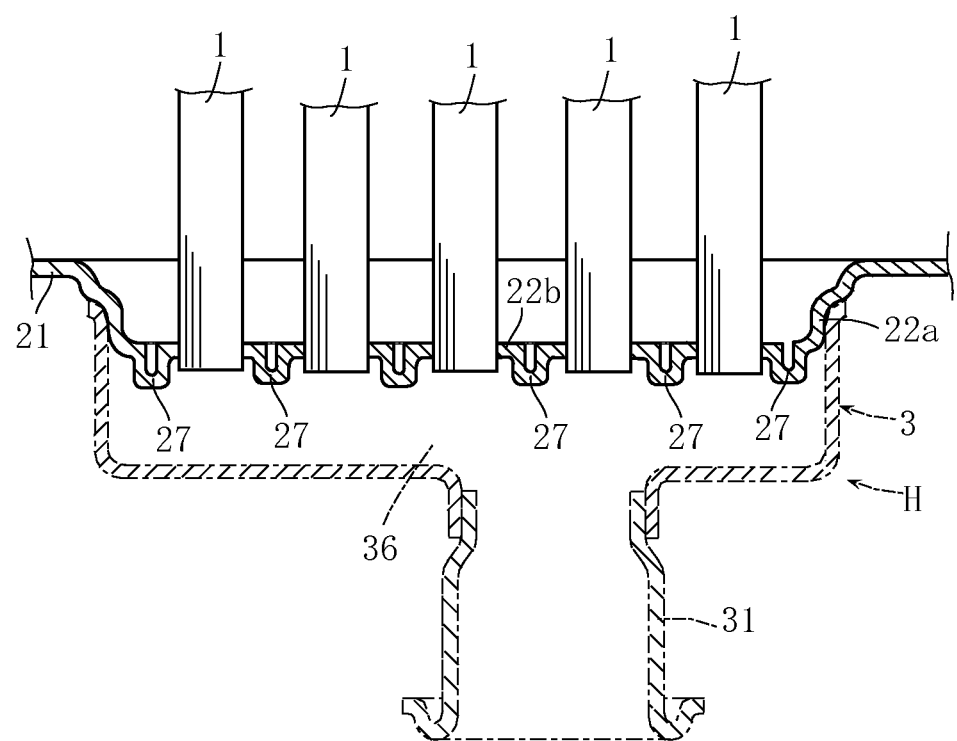
FIG. 8B is a sectional view taken along the line VIIIb to VIIIb in FIG. 8A.

In a heat exchanger HE4 shown in FIG. 8A and FIG. 8B, the tip end wall 22b of the bulging portion 22 of the case 2 (the first wall of the header) is basically flat (does not curve). A protruding portion 27 is provided between the connection portions of the heat transfer tubes 1 on the tip end wall 22b. The protruding portion 27 is formed by a press-working of the tip end wall 22b and protrudes toward the inside of the chamber 36. On the other hand, the protruding portion 27 can protrude toward the outside of the chamber 36 unlike the embodiment of the present invention.

In the embodiment of the present invention, a plurality of protruding portions 27 are integrally formed on the tip end wall 22b, so that the section modulus of the tip end wall 22b increases and the rigidity is enhanced. As a result, the thickness of the tip end wall 22b is reduced and the preferable strength against the water hammer is obtained. The protruding portion 27 is positioned close to the welded portion of the heat transfer tubes 1 and the tip end wall 22b, so that such a structure is preferable for preventing a large stress on the welded portion.

Figure 9A:
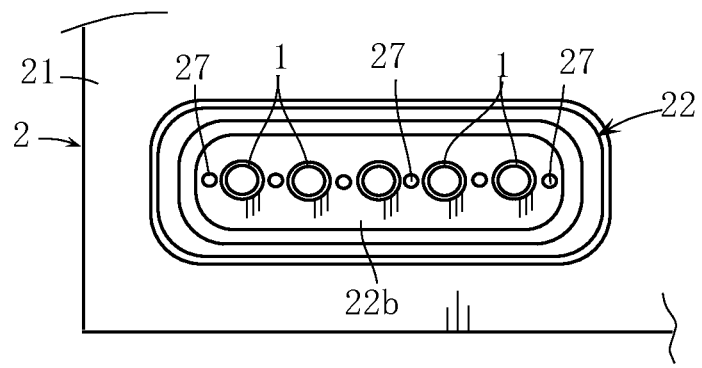
FIG. 9A and FIG. 9B are front views of the substantial part showing another embodiment of the present invention.
Figure 9B:
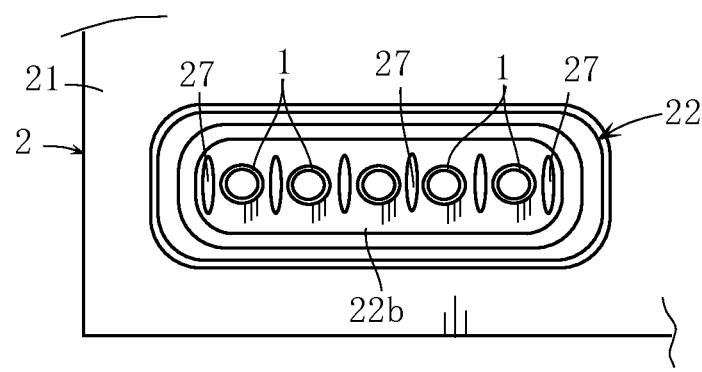

The protruding portion 27 in FIG. 8A and FIG. 8B is substantially rectangle and vertically long. However, the specific shape of the protruding portion 27 is not limited to such a shape. The protruding portion 27 can be circular or formed like a dot as shown in FIG. 9A or can be substantially ellipse as shown in FIG. 9B.

Fifth Embodiment

Figure 10:
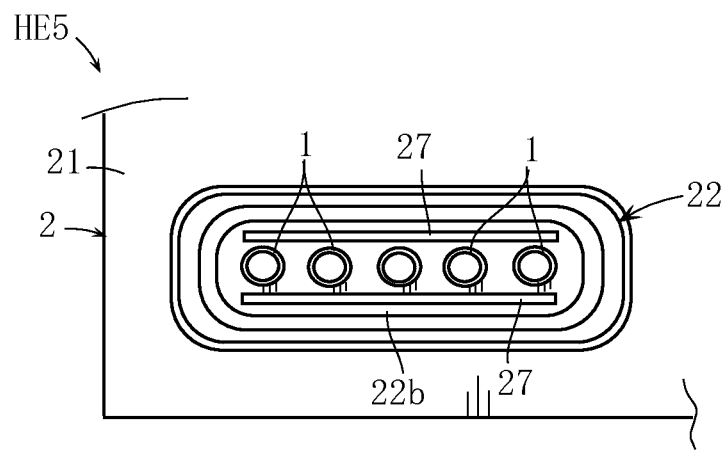
FIG. 10 is a front view of the substantial part showing another embodiment of the present invention.

In a heat exchanger HE5 shown in FIG. 10, the tip end wall 22b of the bulging portion 22 is provided with the protruding portion 27 like the heat exchanger HE4 as mentioned above. The protruding portion 27 is provided at a position vertically offset from the connection portion of the heat transfer tubes 1 and is arranged in the same direction as the arrangement direction of the heat transfer tubes 1 (in the horizontal direction).

In this embodiment, the tip end wall 22*b* is able to be reinforced. In addition, the protruding portion 27 is able to be close to the welded portion of the heat transfer tubes 1 and to be formed in a large size, so that such a structure is further preferable for preventing a large stress on the welded portion of the heat transfer tubes 1.

The above-mentioned protruding portion 27 can be provided for the wall 30*a* of the auxiliary member 3 (the second wall of the header) in place of or in addition to the tip end wall 22*b*, although it is not shown in the figure.

Sixth Embodiment

Figure 11:
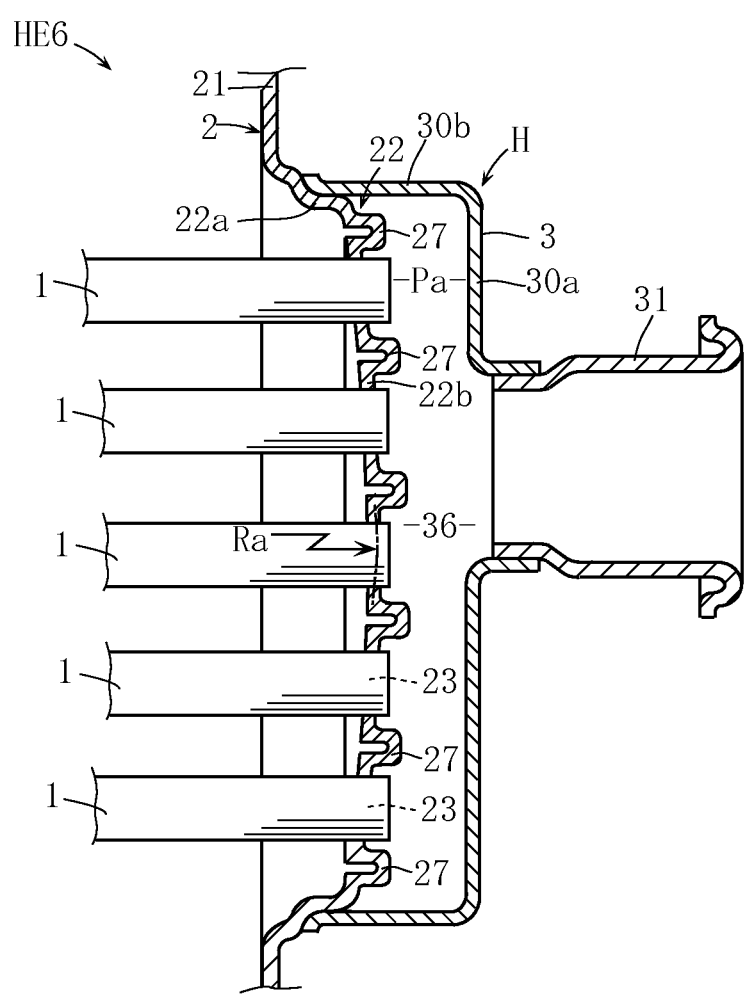
FIG. 11 is a sectional view of the substantial part showing another embodiment of the present invention.

In a heat exchanger HE6 shown in FIG. 11, the tip end wall 22*b* of the bulging portion 22 (the first wall of the header) curves toward the inside of the chamber 36. In addition, the tip end wall 22*b* is provided with a plurality of protruding portions 27.

In such a structure, the strength of the tip end wall 22*b* is enhanced based on the synergetic effect of the high strength against the water pressure Pa due to the curved tip end wall 22*b* and of the reinforcement by the protruding portion 27.

The above-mentioned measure having the curved wall and the protruding portion 27 for reinforcement can be applied to the wall 30*a* of the auxiliary member 3 (the second wall of the header) in place of or in addition to the tip end wall 22*b*, although it is not shown in the figure.

Seventh Embodiment

Figure 12A:
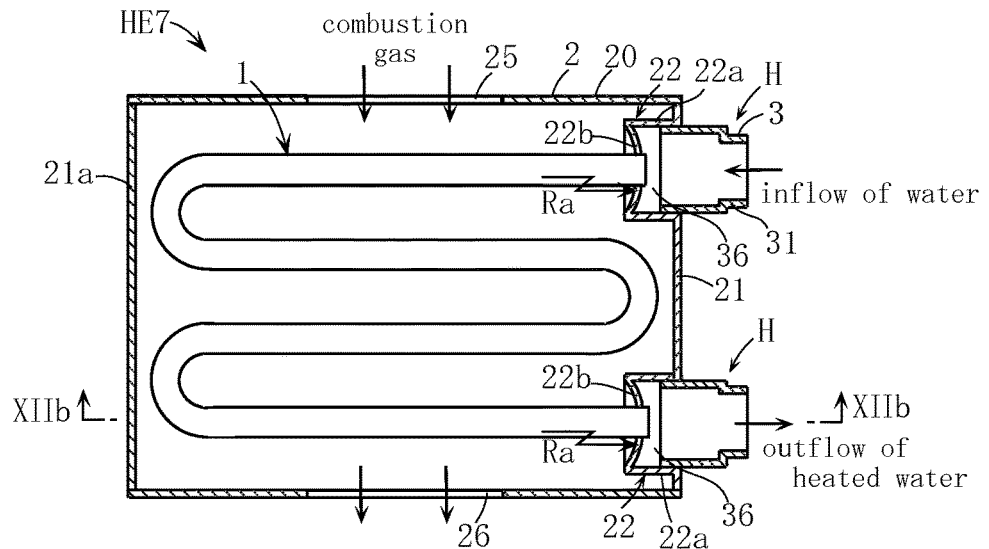
FIG. 12A is a plan sectional view showing another embodiment of the present invention.
Figure 12B:
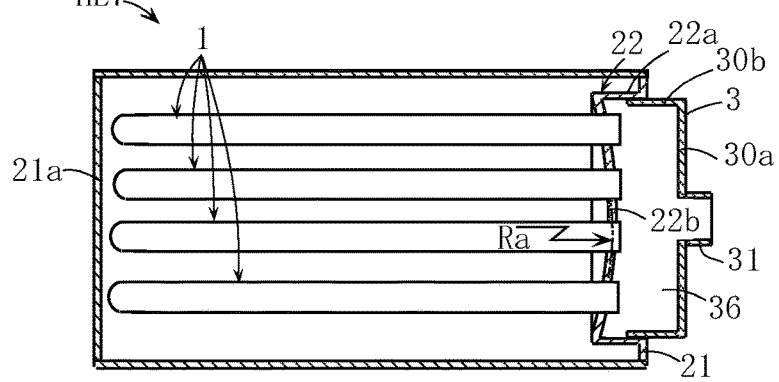
FIG. 12B is a sectional view taken along the line XIIb to XIIb in FIG. 12A.
Figure 12C:
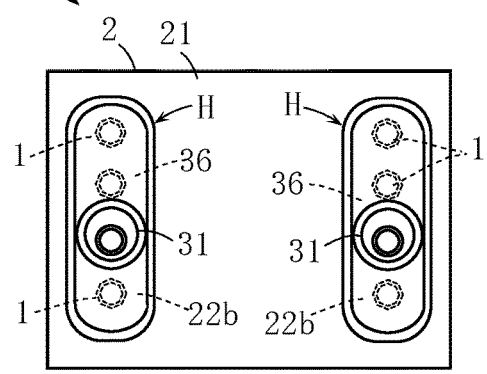
FIG. 12C is a side view thereof.

In a heat exchanger HE7 shown in FIG. 12A to FIG. 12C, the plurality of heat transfer tubes 1 are meandering tube bodies formed substantially horizontal and are arranged vertically in the height direction. In the header H, the side wall 21 of the case 2 is provided with the bulging portion 22 bulging toward the inside of the case 2 and the auxiliary member 3 is fitted into the bulging portion 22. The tip end wall 22*b* of the bulging portion 22 is a wall connected with the heat transfer tubes 1 and corresponds to the first wall of the header H in the present invention. The tip end wall 22*b* curves at a suitable curvature radius Ra so as to protrude toward the inside of the chamber 36. The wall 30*a*, facing the tip end wall 22*b*, of the auxiliary member 3 corresponds to the second wall of the header H in the present invention. The cylindrical wall 22*a* of the bulging portion 22 and the circumferential wall 30*b* of the auxiliary member 3 correspond to the circumferential wall of the header H.

In the embodiment of the present invention, the bulging portion 22 bulges toward the inside of the case 2, but the tip end wall 22*b* curves so as to protrude toward the inside of the chamber 36, so that the similar advantageous effects to the heat exchanger HE1 are obtained.

In the heat exchanger HE7 shown in FIG. 12A to FIG. 12C, the tip end wall 22*b* curves so as to enhance the strength thereof; however, the measures taken to the heat exchangers HE2 to HE6 in the second to the sixth embodiments are of course applied.

The present invention is not limited to the above-mentioned preferred embodiments. The specific configuration of the members of the heat exchanger of the present invention is freely designed within the intended scope of the present invention.

In the above-mentioned embodiments, the bulging portion is provided for the side wall of the case and the header is constituted using the bulging portion. However, the header can be constituted separate from the case without using the above-mentioned bulging portion in the present invention. The heat transfer tubes are not limited to be constituted with the helical tube body or the meandering tube body. Other heat transfer tubes (for example, a straight tube or a U-shaped tube) can be used. The heat transfer tubes and the auxiliary member can be connected by brazing in place of welding.

The heat exchanger of the present invention is not limited to a heat exchanger provided for a water heater to recover latent heat and can be used for several purposes other than water heating.

The invention claimed is:

1. A heat exchanger comprising:
   a plurality of heat transfer tubes;
   a case having a main body and a side wall, wherein the side wall blocks an opening of an end of the main body, the case housing the plurality of heat transfer tubes; and
   a header configured to enter water into the plurality of heat transfer tubes or to deliver heated water from the plurality of heat transfer tubes,
   wherein
   the side wall of the case is partially provided with a bulging portion being formed on a part of the side wall, wherein the side wall departs from a joined portion of a peripheral portion of the side wall and the main body, the bulging portion having a cylindrical wall bulging out of the case and a tip end wall, wherein the tip end wall is integrally connected to the cylindrical wall so as to block a tip portion of the cylindrical wall and wherein the tip end wall has a plurality of penetrating holes,
   the cylindrical wall and the tip end wall are integrally provided with the side wall, and the part of the side wall is bulged from another area of the side wall, ends of the plurality of heat transfer tubes are inserted into the penetrating holes, respectively, and are joined with the tip end wall,
   the header has an auxiliary member including a hollow main body having an open edge forming an opening corresponding to the bulging portion and the opening is blocked by the tip end wall by fitting the open edge onto the cylindrical wall, thereby a chamber communicating with the plurality of heat transfer tubes is formed in the header, and
   a whole of the tip end wall is configured to curve along a first axis of the header and along a second axis of the header, the first axis being perpendicular to the second axis, such that a central area of the tip end wall is positioned closer to a center of the chamber than an outer circumferential area of the tip end wall.

2. The heat exchanger as set forth in claim 1, wherein the hollow main body having an opposite wall facing the tip end wall via the chamber, a whole of the opposite wall is configured to curve in such a manner that a central area of the opposite wall is positioned closer to the center of the chamber than an outer circumferential area of the opposite wall.

3. The heat exchanger as set forth in claim 1, wherein the side wall of the case comprises a metal plate, and the bulging portion is integrally formed with the side wall by a press-working.

4. The heat exchanger as set forth in claim 1, wherein each of the plurality of heat transfer tubes comprises a helical tube body or a meandering tube body, the case has a supply port receiving heating gas and a discharge port discharging heating gas, and the heating gas flowing in the case from the supply port flows out of the case from the discharge port after flowing through the tube body.

5. The heat exchanger as set forth in claim 2, wherein at least one of the tip end wall and the opposite wall is provided with at least one protruding portion partially protruding into an inside or an outside of the chamber.

6. The heat exchanger as set forth in claim 5, wherein the protruding portion protrudes into the inside of the chamber.

7. The heat exchanger as set forth in claim 5, wherein the protruding portion comprises a protruding portion provided between connection portions of the plurality of heat transfer tubes on the tip end wall.

8. The heat exchanger as set forth in claim 5, wherein the plurality of heat transfer tubes are connected to the tip end wall so as to be arranged in a fixed direction, and the protruding portion comprises a protruding portion provided at a position of the tip end wall being offset in a direction intersecting the fixed direction relative to the connection portions of the plurality of heat transfer tubes, the protruding portion being configured to be elongated in the fixed direction.

9. The heat exchanger as set forth in claim 1, wherein the heat exchanger comprises a pair of the headers.

10. The heat exchanger as set forth in claim 1, wherein the heat exchanger comprises a pair of the bulging portions.

* * * * *